(12) United States Patent
Kalusivalingam et al.

(10) Patent No.: US 8,694,654 B1
(45) Date of Patent: Apr. 8, 2014

(54) HOST SIDE PROTOCOLS FOR USE WITH DISTRIBUTED CONTROL PLANE OF A SWITCH

(75) Inventors: Vijayabhaskar Annamalai Kalusivalingam, San Jose, CA (US); Jaihari Loganathan, Sunnyvale, CA (US); Sreekanth Reddy, San Jose, CA (US); Ravi Shekhar, Sunnyvale, CA (US); Jeelani Syed, Bangalore (IN); Quaizar Vohra, Santa Clara, CA (US)

(73) Assignee: Juniper Networks, Inc., Sunnyvale, VA (US)

( * ) Notice: Subject to any disclaimer, the term of this patent is extended or adjusted under 35 U.S.C. 154(b) by 90 days.

(21) Appl. No.: 12/968,846

(22) Filed: Dec. 15, 2010

Related U.S. Application Data

(60) Provisional application No. 61/316,720, filed on Mar. 23, 2010.

(51) Int. Cl.
  *G06F 15/16* (2006.01)
  *G06F 15/173* (2006.01)
  *H04L 12/28* (2006.01)

(52) U.S. Cl.
  USPC ............ 709/228; 709/226; 370/389; 370/400

(58) Field of Classification Search
  None
  See application file for complete search history.

(56) References Cited

U.S. PATENT DOCUMENTS

| | | | |
|---|---|---|---|
| 6,856,620 B1 * | 2/2005 | Dunsmore et al. | 370/389 |
| 7,466,703 B1 * | 12/2008 | Arunachalam et al. | 370/392 |
| 2008/0163207 A1 * | 7/2008 | Reumann et al. | 718/1 |
| 2010/0091779 A1 * | 4/2010 | Juhl et al. | 370/400 |
| 2010/0165877 A1 * | 7/2010 | Shukla et al. | 370/254 |
| 2012/0033665 A1 * | 2/2012 | Jacob Da Silva et al. | 370/389 |

* cited by examiner

*Primary Examiner* — Wen-Tai Lin
(74) *Attorney, Agent, or Firm* — Cooley LLP

(57) ABSTRACT

In one embodiment, an apparatus includes a first network control entity associated with at least a portion of multiple physical ports at a first access switch that are operatively coupled to a peripheral processing device and a switch fabric. The first network control entity can receive a host protocol request from the peripheral processing device, the first network control entity to transmit the host protocol request to a second network control entity associated with at least a portion of multiple physical ports at a second access switch, such that the host protocol request causes the second network control entity to obtain a response to the host protocol request. The first network control entity can receive the response to the host protocol request from the second network control entity and transmit the response to the host protocol request to the peripheral processing device.

20 Claims, 5 Drawing Sheets

HOST SIDE PROTOCOLS FOR USE WITH DISTRIBUTED CONTROL PLANE OF A SWITCH

RELATED APPLICATION

This application claims priority to, and the benefit of U.S. Provisional Patent Application Ser. No. 61/316,720, filed on Mar. 23, 2010, and entitled "Methods And Apparatus Related To Distributed Control Plane Switch Management."

BACKGROUND

Some embodiments described herein relate generally to host control protocols, and more particularly to distributed host control protocols implemented within a switch fabric.

Known network solutions often employ a variety of protocols that facilitate the management of location and address information for each device on a computer network. Many of these protocols, such as Dynamic Host Connection Protocol (DHCP), Address Resolution Protocol (ARP), Reverse Address Resolution Protocol (RARP) and Internet Group Management Protocol (IGMP) are implemented by network hardware and software (executing on hardware) to manage device address information, such as network addresses, forwarding state information and multicast group membership. Because they are generally serviced from the host side of a client-host (or server) relationship, these protocols may be referred to as host-side protocols. While such protocols facilitate the sharing of routing information (such as Internet Protocol (IP) and Media Access Control (MAC) addresses) among network devices, typical implementations of such protocols often result in network bottlenecks and other inefficiencies, as individual routers and switches tasked with distributing this routing information introduce congestion between devices.

Such inefficiencies are often magnified within distributed networks. For example, in many such large-scale networks, protocol processes such as those enumerated above are themselves large in size. Further, the in such networks the transmission of forwarding state information is difficult to scale, as routing and switching devices must often spend inordinate time and resources receiving and responding to host-side protocol requests.

Thus, a need exists for methods and apparatus to distribute the handling of some protocol-based requests among multiple network entities, thereby allowing for acceptable scaling. A need further exists for the dynamic provisioning of network resources, thereby allowing for flexible and efficient allocation of processing power within the network.

SUMMARY

In one embodiment, an apparatus includes a first network control entity associated with at least a portion of multiple physical ports at a first access switch that are operatively coupled to a peripheral processing device and a switch fabric. The first network control entity can receive a host protocol request from the peripheral processing device, the first network control entity to transmit the host protocol request to a second network control entity associated with at least a portion of multiple physical ports at a second access switch, such that the host protocol request causes the second network control entity to obtain a response to the host protocol request. The first network control entity can receive the response to the host protocol request from the second network control entity and transmit the response to the host protocol request to the peripheral processing device.

DETAILED DESCRIPTION

Figure 1:
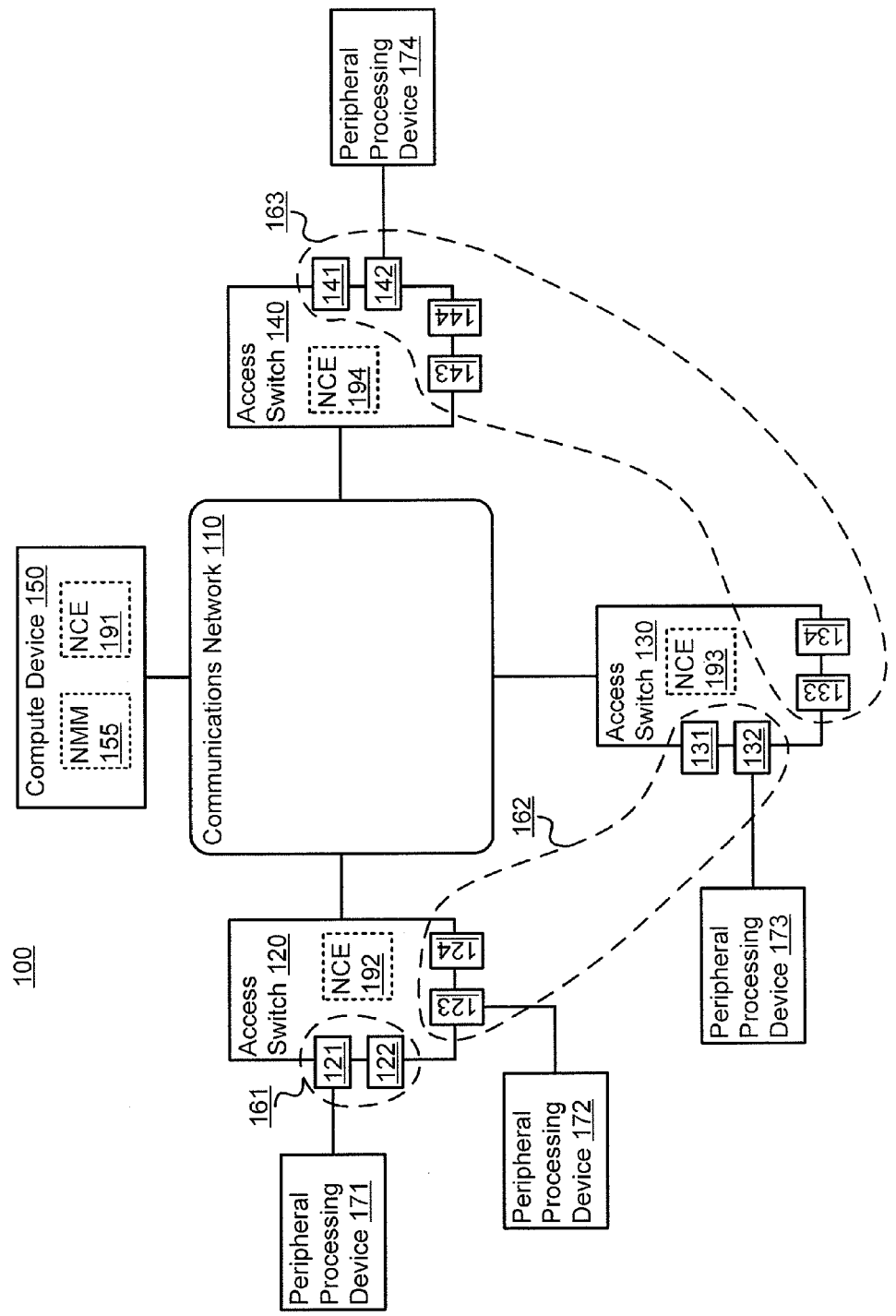
FIG. 1 is a schematic illustration of a switch fabric system, according to an embodiment.

In some embodiments, a peripheral processing device coupled to an access switch situated at the edge of a data center fabric can send one or more requests based on a host protocol such as DHCP, ARP, RARP or IGMP. The request can be received at the access switch via a physical port, recognized as appropriately handled by a control plane of the data center fabric, and thus passed within the access switch to a network control entity ("NCE"). The NCE can be, for example, a process that manages host protocol requests and device address information for a portion of the data center fabric. In some embodiments, the NCE can perform a lookup on a locally-stored table containing address information for one or more network devices referenced by the request. The address information can include, for example, Internet Protocol (IP) and/or Media Access Control (MAC) address information for the one or more network devices.

If the NCE is unable to determine at least a portion of the address information requested by the host protocol request, the NCE can optionally broadcast the request to one or more other NCEs executing at, for example, other access switches included in the data center fabric. In some embodiments, the NCE can transmit the host protocol request to one or more other network devices included in the data center fabric, such as a compute device optionally including a network management module ("NMM") and/or one or more NCEs. In some embodiments, the one or more NCEs included on the compute device can serve as a bridge between one or more virtual local area networks (VLANs) defined within one or more portions of the data center fabric. In such embodiments, these NCEs can include address information sufficient to enable routing of host protocol requests, host protocol responses and/or other communications between devices included in two or more different VLANs within the data center fabric.

In some embodiments, each NCE and/or NMM receiving the host protocol request can optionally access one or more lookup tables and/or data records (such as a database) to determine the requested information. In some embodiments, one or more NCEs and/or devices within the data center fabric can provide the requested information, such as, for example, a MAC address of a destination peripheral processing device, or an IP address for a newly-initialized peripheral processing device or access switch. Having determined the requested information, the responding device or NCE can define and transmit a response to the host protocol request back through the data center fabric to the originally-requesting peripheral processing device. In some embodiments, the responding device or NCE, and/or other device or NCE included along the network path back to the original peripheral processing device, can broadcast the response or relevant address information included therein to a multiple NCEs currently executing within the data center fabric. In this manner, the data center fabric can maintain current address information for the various devices and entities included therein, and distribute such information throughout the network for increased efficiency in responding to host protocol requests.

FIG. 1 is a schematic illustration of a switch fabric system, according to an embodiment. More specifically, FIG. 1 illustrates a Switch Fabric System 100 that includes a Communications Network 110 physically and/or operatively coupled to a Compute Device 150 and Access Switches 120, 130 and 140. The Access Switch 120 is physically and/or operatively coupled to Peripheral Processing Devices 171 and 172, the Access Switch 130 is physically and/or operatively coupled to a Peripheral Processing Device 173 and the Access Switch 140 is physically and/or operatively coupled to a Peripheral Processing Device 174. The Compute Device 150 includes a Network Management Module ("NMM") 155 and a Network Control Entity ("NCE") 191. The Access Switches 120, 130 and 140 include NCEs 192, 193 and 194, and Physical Ports 121-124, 131-134 and 141-144, respectively. The Physical Port 121 is coupled to the Peripheral Processing Device 171, the Physical Port 123 is coupled to the Peripheral Processing Device 172 and the NCE 192 is associated with the Physical Ports 121 and 122. The NCE 193 is associated with the Physical Ports 123, 124, 131, 132, and the Physical Port 132 is coupled to the Peripheral Processing Device 173. The NCE 194 is associated with the Physical Ports 133, 134, and 141-144, and the Physical Port 142 is coupled to the Peripheral Processing Device 174.

The Communications Network 110 can be any combination of hardware and/or software (executing on hardware) configured to transmit data between any of the Peripheral Processing Devices 171, 172, 173 and 174 and/or any of the Access Switches 120, 130 and 140. In some embodiments, the Communications Network 110 can be a switch fabric, such as a multi-stage switch fabric. The Communications Network 110 can optionally transmit data based at least in part on the Ethernet, Fibre Channel, cell, and/or another network protocol. In some embodiments, the Communications Network 110 can include one or more hardware devices configured to exchange data according to one or more of the above-enumerated network protocols. Additional details related to communications networks such as switch fabrics and multi-stage switch fabrics are disclosed in U.S. patent application Ser. No. 12/558,130 entitled "Methods and Apparatus Related to a Low Cost Data Center Architecture," filed Sep. 11, 2009, which is incorporated herein by reference in its entirety.

Each of the Access Switches 120, 130 and 140 can be any combination of hardware and/or software (executing in hardware) situated at the edges of the Communications Network 110. As shown in FIG. 1, the Access Switch 120, 130 and 140 can function as gateways to one or more peripheral processing devices coupled thereto. As also shown in FIG. 1, each of the Access Switches 120, 130 and 140 can host one or more NCEs (described below), such as the NCE 192 hosted at the Access Switch 120, the NCE 193 hosted at the Access Switch 130 and the NCE 194 hosted at the Access Switch 140.

In some embodiments, each of the Access Switches 120, 130 and 140 can be physically located within a chassis of the Switch Fabric System 100. In some embodiments, for example, each Access Switch 120, 130, 140 can be located within the same chassis. In other embodiments, each Access Switch 120, 130, 140 can be located within a different chassis. Structurally, the Access Switches 120, 130, 140 can function as both source access switches and destination access switches. Accordingly, the Access Switches 120, 130, 140 can send data (e.g., a data stream of data packets and/or data cells) to and receive data from a data plane portion of the Communications Network 110, and to and from the respective connected Peripheral Processing Devices 171-174.

As shown in FIG. 1, each of the Access Switches 120, 130, 140 is configured to communicate with the other Access Switches 120, 130, 140 via a data plane portion of the Communications Network 110. Specifically, the data plane portion of the Communications Network 110 is configured to provide any-to-any connectivity between the Access Switches 120, 130, 140 at relatively low latency. For example, the data plane portion of the Communications Network 110 can be configured to transmit (e.g., convey) data between Access Switches 120, 130, 140. In some embodiments, the Communications Network 110 can have at least hundreds or thousands of ports (e.g., egress ports and/or ingress ports) through which Access Switches 120, 130, 140 can transmit and/or receive data.

As discussed in further detail herein, the Access Switches 120, 130, 140 can be configured to host one or more network control entities (NCEs) to manage the Physical Ports 121-124, 131-134 and 141-144 of the Access Switches 120, 130, 140, respectively. For example, as shown in FIG. 1, the Access Switch 120 hosts the NCE 192 to manage the Group of Physical Ports 162 and the Access Switch 140 hosts the NCE 194 to manage the Group of Physical Ports 163. The Compute Device 150 can also optionally host one or more NCEs to manage one or more of the Physical Ports 121-124, 131-134 and 141-144. For example, as shown in FIG. 1, the Compute Device 150 hosts the NCE 191 to manage the Group of Physical Ports 161. The NCEs 191-194 can be processes, applications, virtual machines and/or some other software module (executing in hardware) or a hardware module that is executed at the Compute Device 150, the Access Switch 120, the Access Switch 130 and the Access Switch 140, respectively. In some embodiments, the NCEs 191-194 and/or the NMM 155 can be considered a part of a control plane of the Switch Fabric System 100.

In some embodiments, each of the NCEs 191-193 can be defined, created and/or spawned by a controlling entity or module, such as the NMM 155 hosted at the Compute Device 150. The Compute Device 150 can provision one or more new NCEs based on a current amount of host protocol-based traffic and/or other load-balancing or other network management factors. Each of the NCEs 191-193 can optionally be configured to receive and respond to one or more host protocol requests, such as one or more DHCP, ARP, RARP, IGMP or other host protocol requests. In some embodiments, each of the NCEs 191-193 can be associated with one or more tables or data records (not shown in FIG. 1) storing address information for one or more devices included in the Switch Fabric System 100, such as an IP and/or MAC address of one or more of the Access Switches 120, 130 and 140 and/or one or more of the Peripheral Processing Devices 171-174.

Each of the Physical Ports 121-124, 131-134, and 141-144 can be, for example, a physical communication port, such as an Ethernet port, a Fibre Channel port, a coaxial cable port, or other physical communication port. In some embodiments, one or more of the physical ports enumerated above can be physically coupled to one or more peripheral processing devices to enable exchange of data therewith.

The Compute Device 150 is any combination of hardware and/or software (executing on hardware) configured to perform one or more network management tasks. In some embodiments, the Compute Device 150 can be a server device. The Compute Device 150 can be physically and/or operatively coupled to the Communications Network 110 via, for example, a wired and/or wireless Ethernet, Fibre Channel or other physical and/or logical connection. As shown in FIG. 1, the Compute Device 150 includes and/or hosts the NMM 155 and the NCE 191.

The NMM 155 is any combination of hardware and/or software (executing on hardware) configured to manage the provisioning and allocation of network resources in the Switch Fabric System 100. For example, the NMM 155 can manage the definition, initiation, instantiation and/or destruction of one more NCEs hosted at, for example, a compute device (such as the Compute Device 150) and/or an access switch (such as any of the Access Switches 120, 130 and 140). In some embodiments, the NMM 155 can receive and respond to one or more DHCP requests originating at a peripheral processing device coupled to an access switch, such as any of the Peripheral Processing Devices 171-174 coupled to any of the Access Switches 120, 130 and 140.

In some embodiments, the NMM 155 can also define one or more virtual local area networks (VLANs) within the Switch Fabric System 100. In such embodiments, a VLAN can be comprised of and/or defined by any valid combination of network resources, such as one or more peripheral processing devices and one or more access switches, each of the one or more access switches within the VLAN being in communication with at least one of the one or more peripheral processing devices within the VLAN via one or more physical ports of that access switch.

Each of the Peripheral Processing Devices 171-174 are any combination of hardware and/or software (executing on hardware) capable of transmitting and/or receiving information across the Communications Network 110 via an access switch. In some embodiments, one or more of the above-enumerated peripheral processing devices can be a server device, an application server, a database system, a storage device, gateway, workstation, a compute device and/or the like. Each of the Peripheral Processing Devices 171-174 can optionally be, for example, compute nodes, service nodes, routers, and storage nodes, as described in further detail herein. In some embodiments, one or more of the Peripheral Processing Devices 171-174 can perform one or more computing tasks, such as one or more data storage, Software as a Service (SAS), web service, content request, or other computing tasks.

The Peripheral Processing Devices 171-174 can be in communication with and/or operatively coupled to one or more Physical Ports 121-124, 131-134, 141-144 of the Access Switches 120, 130, 140, respectively, using any suitable connection such as, for example, an optical connection (e.g., an optical cable and optical connectors), an electrical connection (e.g., an electrical cable and electrical connectors) and/or the like. Similarly stated, each of the Physical Ports 121-124, 131-134, 141-144 can provide a communication interface through which a Peripheral Processing Device 171-174 can be operatively coupled to an Access Switch 120, 130, 140, as described in further detail herein. As such, the Peripheral Processing Devices 171-174 are configured to send data (e.g., data packets, data cells, etc.) to and receive data from the Access Switches 120, 130, 140. In some embodiments, each connection between the Peripheral Processing Devices 171-174 and the respective access switches 120, 130, 140 is a direct link. Such a link can be said to be a single physical hop link. In other embodiments, the Peripheral Processing Devices 171-174 can be operatively coupled to the Access Switches 120, 130, 140 via intermediate modules. Such a connection can be said to be a multiple physical hop link.

Figure 2:
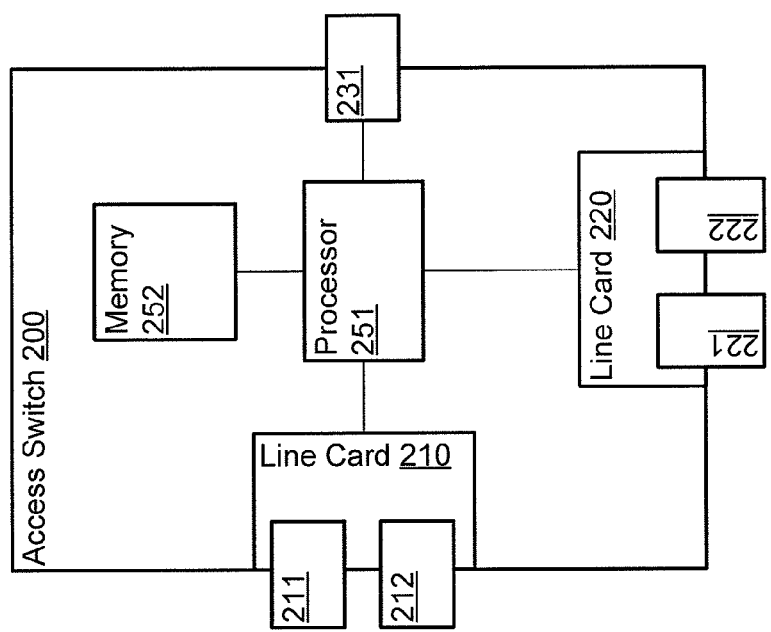
FIG. 2 is a schematic illustration of an access switch of a switch fabric system, according to another embodiment.

FIG. 2 is a schematic illustration of an access switch of a switch fabric system, according to another embodiment. More specifically, FIG. 2 is a system block diagram of an Access Switch 200, similar to the Access Switches 120, 130, 140 described in connection with FIG. 1 above. The Access Switch 200 includes a Processor 251, a Memory 252, a Line Card 210, a Line Card 220, and a Physical Port 231. The Processor 251 is operatively coupled to the Memory 252, the Line Card 210, the Line Card 220 and the Physical Port 231. The Line Card 210 includes the Physical Ports 211 and 212. The Line Card 220 includes the Physical Ports 221 and 222. In some embodiments, the Line Cards 210 and/or 220 include one or more processors and/or memories (not shown).

Similar to the Physical Ports 121-124, 131-134 and 141-144 of the Access Switches 120, 130, 140 (shown in FIG. 1), the Physical Ports 211, 212, 221 and 222 can be configured to communicate with peripheral processing devices. For example, the Physical Ports 211, 212, 221 and 222 can implement a physical layer using twisted-pair electrical signaling via electrical cables or fiber-optic signaling via fiber-optic cables. In some embodiments, some of the Physical Ports 211, 212, 221 and 222 can implement one physical layer such as twisted-pair electrical signaling, and others of the Physical Ports 211, 212, 221 and 222 can implement a different physical layer, such as fiber-optic signaling. Furthermore, the Physical Ports 211, 212, 221 and 222 can be configured to allow the Access Switch 200 to communicate with peripheral processing devices, such as, for example, computer servers (servers), via a common protocol such as Ethernet or Fibre Channel. In some embodiments, some of the Physical Ports 211, 212, 221 and 222 can implement one protocol such as Ethernet and others of the Physical Ports 211, 212, 221 and 222 can implement a different protocol such as Fibre Channel. Thus, the Access Switch 200 can be in communication with multiple peripheral processing devices using homogeneous or heterogeneous physical layers and/or protocols via the Physical Ports 211, 212, 221 and 222.

The Physical Port 231 can be configured to be in communication with other access switches via a communications network such as a switch fabric (e.g., the Communications Network 110). The Physical Port 231 can be part of one or more network interface devices (e.g., a 40 Gigabit (Gb) Ethernet interface, a 100 Gb Ethernet interface, etc.) through which the Access Switch 200 can send signals to and/or receive signals from a communications network. The signals can be sent to and/or received from the communications network via an electrical link, an optical link and/or a wireless link operatively coupled to the Access Switch 200. In some embodiments, the Access Switch 200 can be configured to send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, the Physical Port 231 can implement a different physical layer and/or protocol than those implemented at the Physical Ports 211, 212, 221 and 222. For example, the Physical Port 211, 212, 221 and 222 can be configured to communicate with peripheral processing devices using a data link layer protocol based on data packets and the Physical Port 231 can be configured to communicate via a switch fabric using a data link layer protocol based on data cells. Said differently, the Access Switch 200 can be an edge device of a network switch such as a distributed network switch.

In some embodiments, the Access Switch 200 can be configured to prepare a data packet (e.g., an Ethernet frame and/or packet) to enter a data plane portion of a communications network (e.g., the Communications Network 110). For example, the Access Switch 200 can be configured to forward, classify, and/or modify the packet encapsulation (e.g., modify, add and/or remove a header portion, footer portion and/or any other identifier included within the data packet) of a data packet prior to sending the data packet to the communications network. Additionally, the Access Switch 200 can be configured to partition and/or divide the data packet into data cells (e.g., having fixed length payloads) prior to sending the data cells to the switch fabric. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Figure 3:
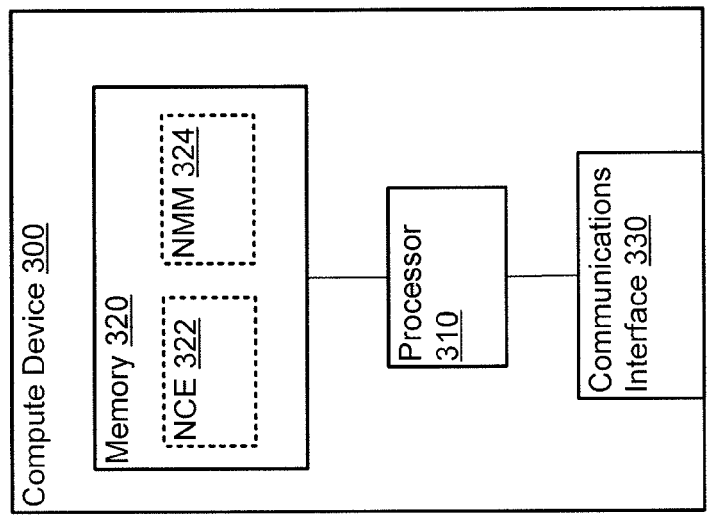
FIG. 3 is a schematic illustration of a compute device of a switch fabric system, according to another embodiment.

FIG. 3 is a schematic illustration of a compute device of a switch fabric system, according to another embodiment. More specifically, FIG. 3 is a system block diagram of a Compute Device 300 substantially similar to the Compute Device 150 described in connection with FIG. 1 above, according to an embodiment. The Compute Device 300 includes a Processor 310, a Memory 320, and a Communications Interface 330. The Processor 310 is operatively coupled to the Memory 320 and the Communications Interface 330. The Compute Device 300 can communicate with other compute devices, peripheral processing devices and/or access switches via the Communications Interface 330.

As illustrated in FIG. 3, the Compute Device 300 can host a Network Control Entity ("NCE") 322 and a Network Management Module 324 similar to the Network Control Entity 191 and the Network Management Module ("NMM") 155, respectively. In other words, the NCE 322 and the NCE 324 can each be one of a process, application, virtual machine, and/or some other software module (executing in hardware) or a hardware module that is executed at the Compute Device 300. In some embodiments, for example, instructions that implement the NCE 322 and/or the NMM 324 can be stored at the Memory 320 and executed at the Processor 310.

In some embodiments, the Compute Device 300 can be dedicated to hosting the NCE 322 and/or the NMM 324. In other words, the Compute Device 300 can allocate all or substantially all of its computing resources (e.g., processing capacity and memory) to the NCE 322 and/or the NMM 324. In some embodiments, the Compute Device 300 can host other processes, applications, virtual machines, and/or software modules (executing in hardware) in addition to the NCE 322 and/or the NMM 324. For example, the Compute Device 300 can be a general purpose compute device or compute node that is configured to host multiple processes, applications, virtual machines, and/or software modules.

Figure 4:
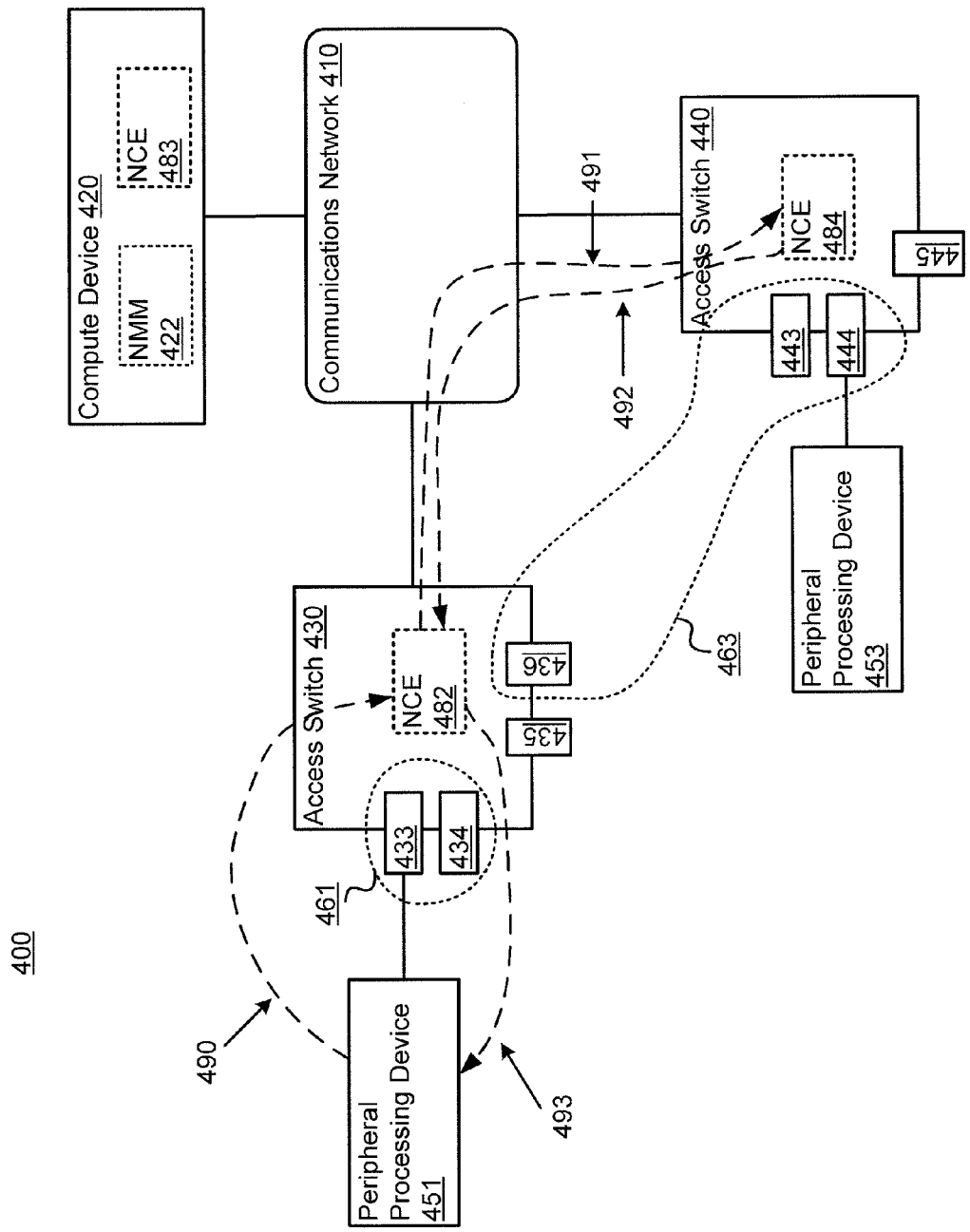
FIG. 4 is a schematic illustration of a switch fabric system that provides distributed handling of ARP requests, according to another embodiment.

FIG. 4 is a schematic illustration of a switch fabric system that implements distributed handling of ARP requests, according to another embodiment. More specifically, FIG. 4 illustrates a Switch Fabric System 400 including a Communications Network 410 physically and/or operatively coupled to a Compute Device 420 and Access Switches 430 and 440.

The Access Switch 430 is physically and/or operatively coupled to the Peripheral Processing Device 451, and the Access Switch 440 is physically and/or operatively coupled to the Peripheral Processing Device 453.

As shown in FIG. 4, the Compute Device 420 hosts an NMM 422 and an NCE 483. The Access Switch 430 includes Physical Ports 433-436, and the Peripheral Processing Device 451 is operatively and/or physically coupled to the Access Switch 430 via the Physical Port 433. The Access Switch 440 includes Physical Ports 443-445, and the Peripheral Processing Device 453 is operatively and/or physically coupled to the Access Switch 440 via the Physical Port 444. As also shown in FIG. 4, the Access Switch 430 hosts an NCE 482 that manages a Group of Physical Ports 461, and the Access Switch 440 hosts an NCE 484 that manages a Group of Physical Ports 463.

In some embodiments, each of the Communications Network 410, the Compute Device 420, the NMM 422, the Access Switches 430 and 440, the Peripheral Processing Devices 451 and 453, the Physical Ports 433-436 and 443-445, and the NCEs 482-484 can be substantially similar to their analogs discussed in connection with FIG. 1 above (i.e., the Communications Network 110, the Compute Device 150, the NMM 155, the Access Switches 120, 130 and 140, the Peripheral Processing Devices 171-174, the Physical Ports 121-124, 131-134 and 141-144 and the NCEs 191-194).

As shown in FIG. 4, the Peripheral Processing Device 451 can communicate with the Peripheral Processing Device 453 via the Access Switches 430 and 440 and the Communications Network 410. In some embodiments, the Peripheral Processing Device 451 can send and/or receive one or more packets (e.g., Ethernet packets) to the Peripheral Processing Device 453 based at least in part on a Media Access Control (MAC) and/or Internet Protocol (IP) address associated with the Peripheral Processing Device 453.

As seen in FIG. 4, the Peripheral Processing Device 451 sends a host protocol request to the NCE 482 (as depicted by a message 490). For purposes of the discussion below, the request can be, for example, an ARP request to obtain a MAC address associated with the Peripheral Processing Device 453 based on an IP address of the Peripheral Processing Device 453. In some embodiments, the ARP request includes an IP address of the Peripheral Processing Device 453 for use in determining the MAC address associated with the Peripheral Processing Device 453, and an IP address of the Peripheral Processing Device 451 for use in sending an ARP response back to the Peripheral Processing Device 451. Alternatively, the request can be a Dynamic Host Connection Protocol (DHCP) request to obtain an IP address for the Peripheral Processing Device 451 or a Reverse Address Resolution Protocol (RARP) request to determine an IP address for the Peripheral Processing Device 451. The request can also be an IGMP membership query, such as a general query, a group-specific query, a group-and-source-specific query, etc.

As shown in FIG. 4, the Peripheral Processing Device 451 sends the ARP request to the Access Switch 430 via the Physical Port 433. Upon reception of the ARP request, the Access Switch 430 passes the ARP request to the NCE 482 because the NCE 482 has been preconfigured to manage the Group of Physical Ports 461 (of which the Physical Port 433 is a member).

Having received the ARP request, the NCE 482 can next perform one or more actions to obtain, on behalf of the Peripheral Processing Device 451, an ARP response including a MAC address associated with the Peripheral Processing Device 453. In some embodiments, the NCE 482 can perform a lookup on one or more tables and/or database records stored locally with the NCE 482 that contain address information associated with one or more devices included in the Switch Fabric System 400. In some embodiments, the one or more tables and/or database records can be included in the Access Switch 430 or physically and/or operatively coupled thereto.

If the NCE 482 determines a MAC address and/or other address information associated with the Peripheral Processing Device 453, it can define an ARP response including the MAC address and/or other address information and send the ARP response to the Peripheral Processing Device 451 for use in defining one or more data packets for transmission to the Peripheral Processing Device 453.

If the NCE 482 determines that no MAC address or other address information associated with the Peripheral Processing Device 453 is included and/or accessible within its one or more tables and/or database records, the NCE 482 can send the ARP request to one or more devices included in the Switch Fabric System 400 and/or each of the peripheral processing devices currently coupled to the Access Switch 430. In some embodiments, the NCE 482 can send the ARP request to all or substantially all NCEs currently executing within the same Local Area Network (LAN) and/or Virtual Local Area Network (VLAN) as the NCE 482. For example, the NCE 482 can send the ARP request to both the NCE 483 executing at the Compute Device 482 and the NCE 484 executing at the Access Switch 440.

As shown in FIG. 4 and depicted by the message 491, the ARP request is sent from the Access Switch 430 to the Access Switch 440 via a control plane portion of the Communications Network 410. Upon arrival at the Access Switch 440, the ARP request can be passed to the NCE 484 for handling. In some embodiments, the signal can include, at various points along the path from the NCE 482 to the NCE 484, one or more data packets formatted according to one or more of the Ethernet, Fibre Channel and/or cell protocols.

Having received the ARP request, the NCE 484 can next perform a MAC address lookup for the IP address included in the ARP request using one or more data tables and/or database records stored locally with the NCE 484 and/or operatively coupled thereto. If the NCE 484 determines a MAC address and/or other address information associated with the Peripheral Processing Device 453, it can define an ARP response that includes the MAC address and/or other address information associated with the Peripheral Processing Device 453, and send that ARP response to the NCE 482 via the control plane portion of the Communications Network 410 (as depicted by a message 492). If, alternatively, the NCE 484 determines that no MAC address and/or other information associated with the Peripheral Processing Device 453 is included in the queried data tables and/or database records, the NCE 484 can broadcast the ARP request to all peripheral processing devices currently coupled to the Access Switch 440 to determine if any has an IP address matching the IP address specified by the ARP request (not shown in FIG. 4). For example, the NCE can send the ARP request to the Peripheral Processing Device 453. In some embodiments, the NCE 484 can forward the ARP request to one or more other NCEs hosted at a device included in the Switch Fabric System 400, in addition to or instead of broadcasting the ARP request to all peripheral processing devices coupled to the Access Switch 440. For example, in some embodiments, the NCE 484 can forward the ARP request and/or other IP-requesting signal to the NCE 483 and/or NMM 422 hosted at the Compute Device 420 for handling thereby.

Upon receipt of the ARP response and/or other MAC address information associated with the Peripheral Processing Device 453, the NCE 482 next transmits the ARP response to the Peripheral Processing Device 451 (as depicted by a message 493) for use in defining and sending subsequently one or more data packets to the Peripheral Processing Device 453. In some embodiments, the NCE 482 and/or the Peripheral Processing Device 451 can update one or more data tables and/or database records with the received MAC address/IP address pair, for use when addressing subsequent communications to the Peripheral Processing Device 453. In some embodiments, the Border Gateway Protocol (BGP) can be used to propagate the MAC address and/or IP address information associated with Peripheral Processing Device 453 to one or more other NCEs so that subsequent ARP requests can be handled locally by the one or more NCEs.

Figure 5B:
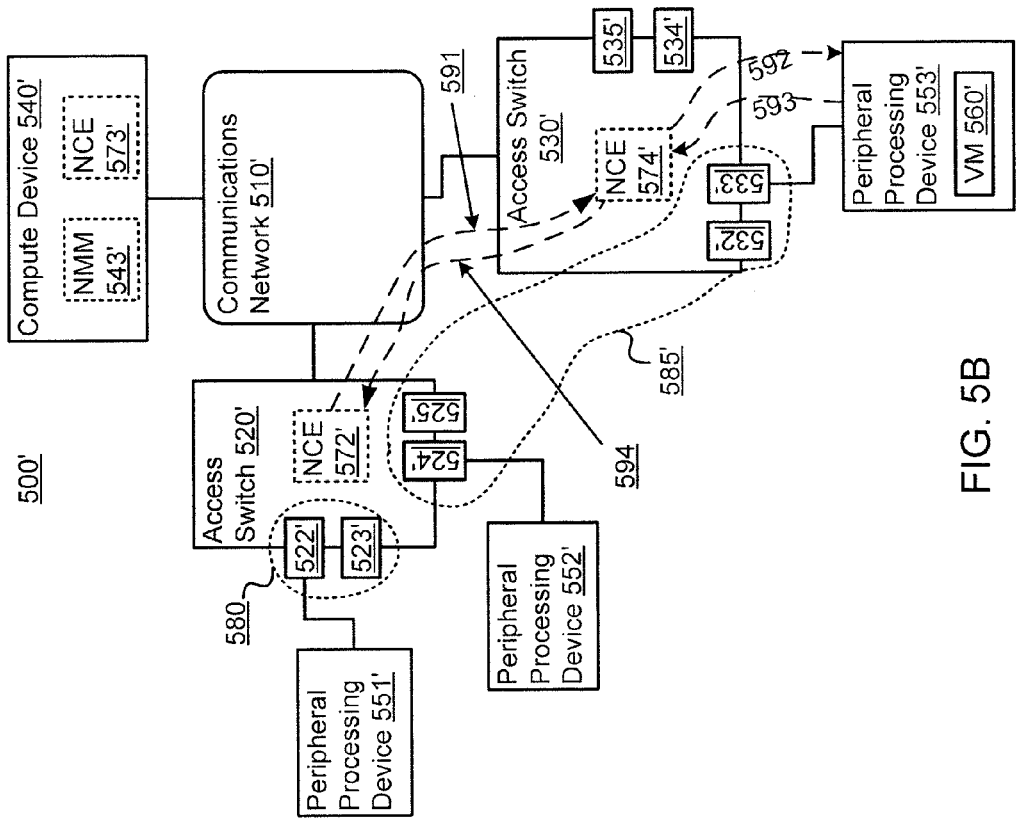
FIGS. 5A and 5B are schematic illustrations of a switch fabric system at a first time and a second time, respectively, that handles virtual machine relocation, according to another embodiment.
Figure 5A:
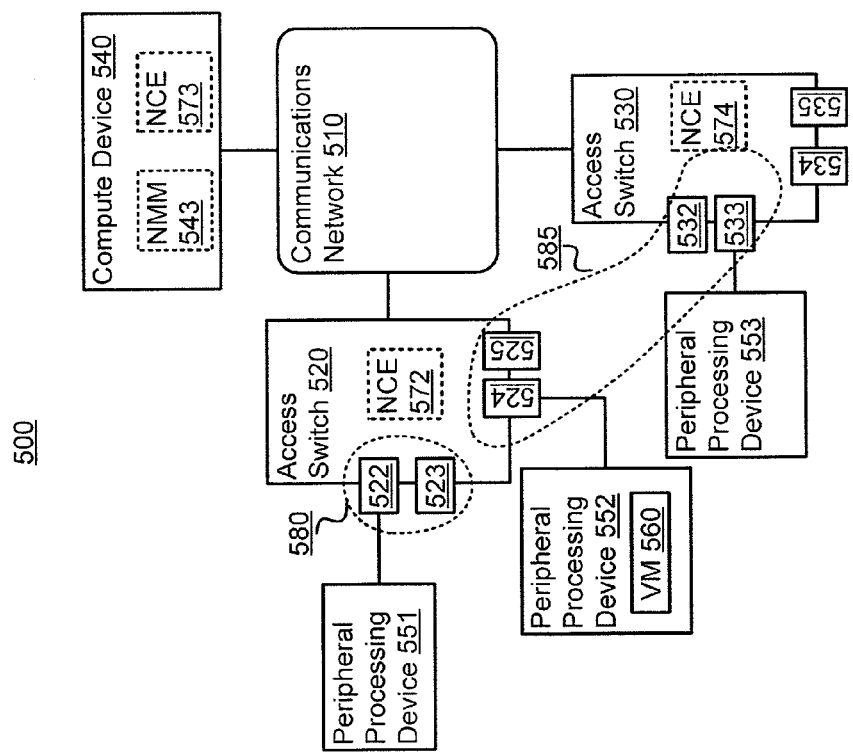

FIGS. 5A and 5B are schematic illustrations of a switch fabric system that graciously handles virtual machine relocation, according to another embodiment. More specifically, FIG. 5A illustrates a Switch Fabric System 500 as configured at a first time, and FIG. 5B illustrates the same Switch Fabric System 500' as configured at a second time after the first time. A Virtual Machine 560 is hosted at a Peripheral Processing Device 552 at the first time, and the same Virtual Machine 560' is hosted at a Peripheral Processing Device 553' at the second time.

As shown in FIG. 5A, the Switch Fabric System 500 includes a Communications Network 510 physically and/or operatively coupled to a Compute Device 540 and Access Switches 520 and 530. The Access Switch 520 is physically and/or operatively coupled to the Peripheral Processing Devices 551 and 552, and the Access Switch 530 is physically and/or operatively coupled to the Peripheral Processing Device 553.

As also shown in FIG. 5A, the Compute Device 540 hosts a Network Management Module ("NMM") 543 and a Network Control Entity ("NCE") 573. The Access Switch 520 includes Physical Ports 522-525, and the Peripheral Processing Device 551 is operatively and/or physically coupled to the Access Switch 520 via the Physical Port 522. The Access Switch 530 includes Physical Ports 532-535, and the Peripheral Processing Device 553 is operatively and/or physically coupled to the Access Switch 530 via the Physical Port 533. As also shown in FIG. 5A, the Access Switch 520 hosts an NCE 572 that manages a Group of Physical Ports 580, and the Access Switch 530 hosts an NCE 574 that manages a Group of Physical Ports 585.

In some embodiments, each of the Communications Network 510, the Compute Device 540, the NMM 543, the Access Switches 520 and 530, the Peripheral Processing Devices 551-553, the Physical Ports 522-525 and 532-535, and the NCEs 572-574 can be substantially similar to their analogs discussed in connection with FIG. 1 above (i.e., the Communications Network 110, the Compute Device 150, the NMM 155, the Access Switches 120, 130 and 140, the Peripheral Processing Devices 171-174, the Physical Ports 121-124, 131-134 and 141-144 and the NCEs 191-194).

As shown in FIG. 5, the Peripheral Processing Device 552 hosts a Virtual Machine 560. In some embodiments, the Virtual Machine 560 can be any valid virtual machine, module, or process. For example, the Virtual Machine 560 can be a system virtual machine providing a complete operating system platform, such as a Microsoft Windows, UNIX, Linux, Apple Mac OS X, IBM OS/2, Sun Solaris or other operating system platform. In such embodiments, the Virtual Machine 560 can provide a platform of an operating system either different from or the same as the operating system platform on or within which it executes on the Peripheral Processing Device 552. Alternatively, in some embodiments the Virtual Machine 560 can be a process-level virtual machine providing an instance of a single program or application.

In some embodiments, one or more of the NCEs 572-574 can be associated with a locally-stored data structure that includes address information associated with one or more of the Peripheral Processing Devices 551-553 and/or the Virtual Machine 560. For example, a data structure stored locally with the Peripheral Processing Device 551 could include address information indicating that the Virtual Machine 560 is hosted at the Peripheral Processing Device 552, and/or one or more MAC, IP and/or other addresses associated with the Virtual Machine 560 for use in addressing communications thereto.

FIG. 5B illustrates the Switch Fabric System 500' as configured at the second time. As shown in FIG. 5B, the Switch Fabric System 500' includes the constituent elements as discussed in connection with FIG. 5A above, with the Virtual Machine 560' being hosted at the Peripheral Processing Device 553' as opposed to the Peripheral Processing Device 552.

The Peripheral Processing Device 551' can attempt to send one or more data packets to the Virtual Machine 560' based at least in part on address information associated with the Virtual Machine 560' as provided by, for example, the NCE 572'. For example, the Peripheral Processing Device 551' can define and transmit one or more data packets for transmission to the Virtual Machine 560' based on address information associated with the Virtual Machine 560. Additional details related to methods and apparatus for the routing of data to a virtual resource (such as the Virtual Machine 560/560') are disclosed in U.S. patent application Ser. No. 12/346,612 entitled "Methods and Apparatus Related to Data Transmissions Between Virtual Resources at a Host Device," and U.S. patent application Ser. No. 12/346,618 entitled "Methods and Apparatus for Provisioning at a Network Device in Response to a Virtual Resource Migration Notification", which are incorporated herein by reference in their entirety. More specifically, the Peripheral Processing Device 551' can define and transmit the one or more data packets based on a MAC address of a peripheral processing device at which the Virtual Machine 560' is believed to be hosted, such as, for example, the Peripheral Processing Device 552 (as shown in FIG. 5A, described above). Although not shown in FIG. 5B, the Peripheral Processing Device 552 can transmit the one or more data packets to the NCE 572' for handling.

As shown in FIG. 5B, because the Virtual Machine 560' is no longer hosted at the Peripheral Processing Device 552 at the second time, such transmitted data packets will not arrive at the Virtual Machine 560' (now hosted at the Peripheral Processing Device 553'). In some embodiments, the Peripheral Processing Device 551' and/or the NCE 572' can determine that the one or more data packets have not arrived at the Virtual Machine 560', i.e., that the Physical Port 524/524' (to which the Virtual Machine 560 was coupled at the first time) is now a "dead port". For example, the NCE 572' can receive a notification from the Peripheral Processing Device 552' and/or another NCE, such as the NCE 573', indicating that the one or more packets have not arrived at the Virtual Machine 560'. In some embodiments, the notification can be sent based on one or more known Quality of Service (QoS) standard protocols or implementations and/or in accordance with another QoS protocol. Additional details related to QoS standards and/or other methods and apparatus for determining successful arrival of network packets are disclosed in U.S. patent application Ser. No. 12/242,224 entitled "Methods and Apparatus for Flow Control Associated with Multi-Staged Queues", filed Sep. 30, 2008, which is incorporated herein by reference in its entirety.

Having determined that the one or more data packets have not arrived at the Virtual Machine 560', the NCE 572' holds the one or more data packets in a queue (not shown in FIG. 5B) at or accessible by the NCE 572'. As shown in FIG. 5B, the NCE 572' next defines and sends an ARP request to the NCE 574' executing at the Access Switch 530' (as depicted by the message 591). The ARP request can also include an IP address of the Access Switch 520' for use in sending a response to the ARP request back to the NCE 572'. The ARP request can also include an IP address of the Peripheral Processing Device 551' for use in sending the response to the ARP request back to the Peripheral Processing Device 551'. In some instances, the ARP request includes a static IP address of the Virtual Machine 560', which can be used by a recipient of the ARP request to determine the new MAC address of the Virtual Machine 560' based on a lookup table or data record, and/or to query one or more devices (such as peripheral processing devices), to determine if that peripheral processing devices currently hosts the Virtual Machine 560'. Although not shown in FIG. 5B, the NCE 572' can also broadcast the ARP request to each NCE currently executing at any network device within the same VLAN as the NCE 572' (not shown in FIG. 5B) and/or the Switch Fabric System 500', and/or any peripheral processing device coupled to that VLAN and/or the Switch Fabric System 500'. In some instances, the NCE 572' can broadcast the ARP request only to a specific NCE(s) and/or access switch(es) based on, for example, address and/or routing information as received from, for example, the NMM 543' and/or the NCE 573'.

Upon receipt of the ARP request from the NCE 572', the NCE 574' broadcasts the ARP request to each peripheral processing device connected to the Access Switch 530'. Because the Virtual Machine 560' is currently (i.e., at the second time) hosted at the Peripheral Processing Device 553', the Peripheral Processing Device 553' receives the broadcast ARP request (depicted by a message 592) and responds to the NCE 574' with MAC address information associated with the Virtual Machine 560' (as depicted by a message 593).

Having received a response to the broadcast ARP request, the NCE 574' can optionally update one or more routing tables and/or records associated therewith and broadcast the relevant MAC address information for recording by all or substantially all NCEs currently executing within a same VLAN as the NCE 574' and/or the Switch Fabric System 500'. As shown in FIG. 5B, the NCE 574' next sends the ARP response to the NCE 572' (as depicted by a message 594). The NCE 574' can also send the ARP response to the NCE 572' in one or more messages and/or data packets formatted according to the BGP protocol, the one or more messages and/or data packets including the IP and/or MAC address information of the Virtual Machine 560'. The NCE 572' can then optionally update one or more routing tables and/or records associated therewith, before using the MAC address information included in the ARP response to address and send the queued one or more data packets to the Virtual Machine 560' via the control plane portion of the Communications Network 510'. Alternatively, the NCE 572' can relay the ARP response (not shown in FIG. 5B) to the Peripheral Processing Device 551' for the addressing and sending of one or more data packets to the Virtual Machine 560'.

Although discussed in connection with an ARP request sent to determine a new location of and/or address information for the Virtual Machine 560', in some embodiments, a RARP request (instead of an ARP request) can be used and can include a known MAC address of the moved virtual machine. In such embodiments, rather than determining a MAC address for the moved virtual machine based on, for example, an IP address associated therewith, the RARP response can include an IP address associated with the moved virtual machine based on the known MAC address of the moved virtual machine included in the RARP request. In such embodiments, the RARP request and response can follow substantially the same path through the Switch Fabric System described above in reference to an ARP request and response.

Further, although not shown in FIG. 5A or FIG. 5B, the Virtual Machine 560' can receive a new IP address upon its migration from the Peripheral Processing Device 552 at the first time (as shown in FIG. 5A) to the Peripheral Processing Device 553' at the second time (as shown in FIG. 5B). To do so, the Virtual Machine 560' can send a DHCP request via the Peripheral Processing Device 553', the NCE 574', the Access Switch 530' and the Communications Network 510' to the NMM hosted 543 at the Compute Device 540'. The NMM 543' can then send a DHCP response, including a new IP address, to the Virtual Machine 560' via a control plane portion of the Communications Network 510', the Access Switch 530', the NCE 574' and the Peripheral Processing Device 553'. In such instances, to enable subsequent identification of the Virtual Machine 560' by other devices within the Switch Fabric System 500', the Peripheral Processing Device 553', the NCE 574' and/or the Access Switch 530' can broadcast one or more BGP-formatted messages including the new IP address of the Virtual Machine 560' throughout the Switch Fabric System 500' for recording by each NCE, NMM and/or peripheral processing device currently executing at and/or included therein.

Figure 6:
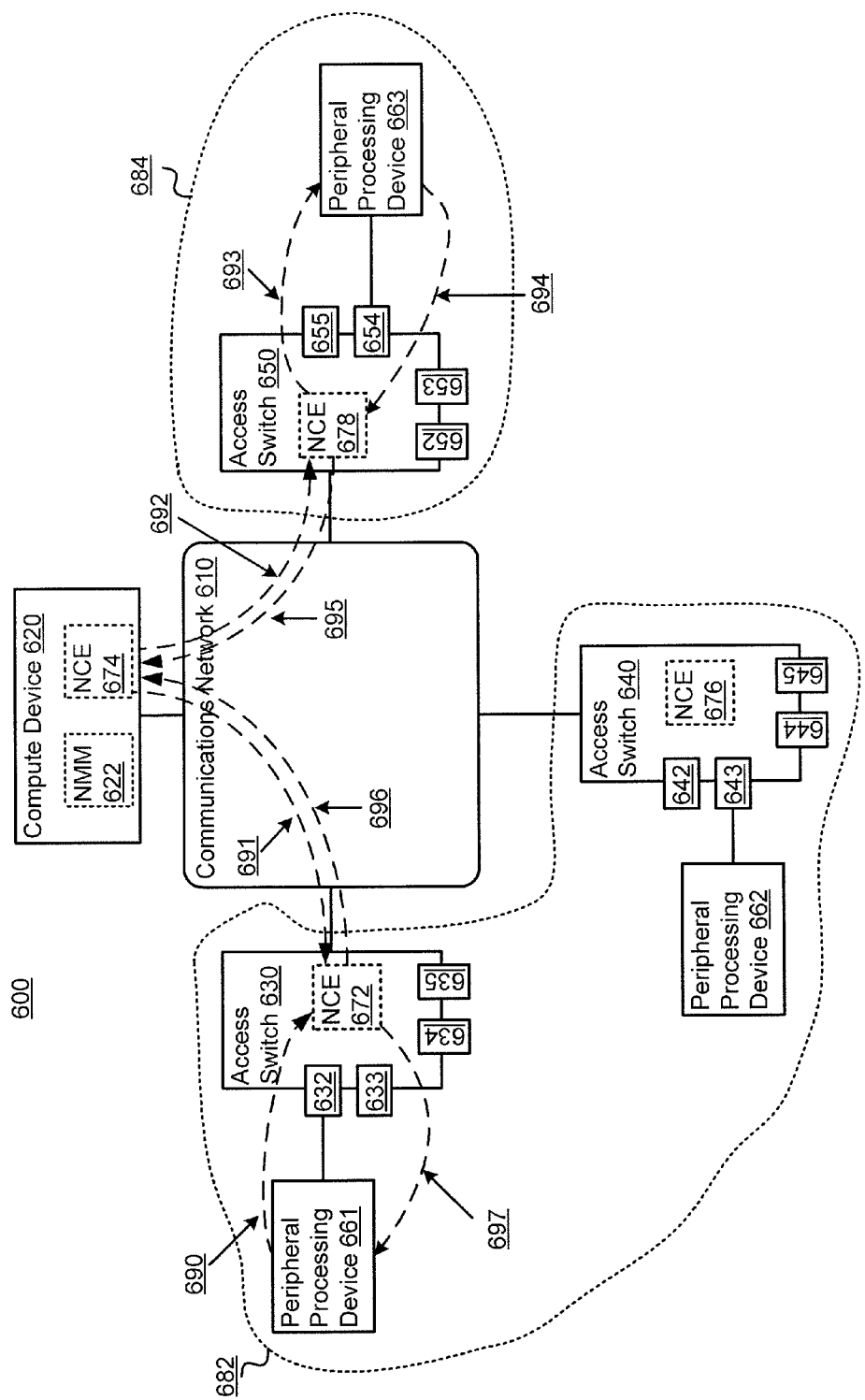
FIG. 6 is a schematic illustration of a switch fabric system that provides distributed handling of host protocol requests across VLANs, according to another embodiment.

FIG. 6 is a schematic illustration of a switch fabric system that provides distributed handling of host protocol requests across VLANs, according to another embodiment. More specifically, FIG. 6 illustrates a Switch Fabric System 600 including a Communications Network 610 physically and/or operatively coupled to a Compute Device 620 and Access Switches 630, 640 and 650. The Access Switch 630 is physically and/or operatively coupled to the Peripheral Processing Device 661, the Access Switch 640 is physically and/or operatively coupled to the Peripheral Processing Device 662, and the Access Switch 650 is physically and/or operatively coupled to the Peripheral Processing Device 663. The Access Switches 630 and 640 are included in a first VLAN 682, and the Access Switch 650 is included in a second VLAN 684.

As shown in FIG. 6, the Compute Device 620 hosts an NMM 622 and an NCE 674. The Access Switch 630 includes Physical Ports 632-635, and the Peripheral Processing Device 661 is operatively and/or physically coupled to the Access Switch 630 via the Physical Port 632. The Access Switch 640 includes Physical Ports 642-645, and the Peripheral Processing Device 662 is operatively and/or physically coupled to the Access Switch 640 via the Physical Port 643. The Access Switch 650 includes Physical Ports 652-655, and the Peripheral Processing Device 663 is operatively and/or physically coupled to the Access Switch 650 via the Physical Port 654. As also shown in FIG. 6, the Access Switch 630 hosts an NCE 672, the Access Switch 640 hosts an NCE 676 and the Access Switch 650 hosts an NCE 678.

In some embodiments, each of the Communications Network 610, the Compute Device 620, the NMM 622, the Access Switches 630, 640 and 650, the Peripheral Processing Devices 661-663, the Physical Ports 632-635, 642-645 and 652-655, and the NCEs 672, 674, 676 and 678 can be substantially similar to their analogs discussed in connection with FIG. 1 above (i.e., the Communications Network 110, the Compute Device 150, the NMM 155, the Access Switches 120, 130 and 140, the Peripheral Processing Devices 171-174, the Physical Ports 121-124, 131-134 and 141-144 and the NCEs 191-194).

As shown in FIG. 6, the Peripheral Processing Device 661 of the first VLAN 682 can communicate with the Peripheral Processing Device 663 of the second VLAN 684 via the data and/or control planes of the Communications Network 610 and the NCE 674. More specifically, the Peripheral Processing Device 661 defines and transmits one or more data packets to the Peripheral Processing Device 663 using address information associated with the Peripheral Processing Device 663 as obtained via a distributed ARP request.

As shown in FIG. 6, the Peripheral Processing Device 661 first defines and sends an ARP request to the NCE 672 via the Physical Port 632 and the Access Switch 630 (as depicted by a message 690). The ARP request can include an IP address of the Peripheral Processing Device 663 for use in determining the MAC address associated with the Peripheral Processing Device 663, and an IP address of the Peripheral Processing Device 661 for use in sending an ARP response back to the Peripheral Processing Device 661. Upon receipt of the ARP request, the NCE 672 can query one or more routing tables and/or records to determine address information of the Peripheral Processing Device 663 and/or broadcast the ARP request to one or more NCEs included in the first VLAN 682 (such as the NCE 676 hosted at the Access Switch 640).

Given its instantiation at the Compute Device 620 and thus outside any VLANs, the NCE 674 can include and/or have access to address and/or routing information for network devices included in one or more VLANs defined within the Switch Fabric System 600 (such as the first VLAN 682 and/or the second VLAN 684). In this manner, the NCE 674 can serve as a connecting link or bridge between network devices included in different VLANs. As such, as shown in FIG. 6, the NCE 672 also sends the ARP request to the NCE 674 executing at the Compute Device 620 (as depicted by a message 691). Upon receipt of the ARP request, the NCE 674 can, based on an IP address of the Peripheral Processing Device 663 included in the ARP request, determine a network location of an access switch to which the Peripheral Processing Device 663 is coupled (i.e., the Access Switch 650 included in the second VLAN 684). Having made this determination, the NCE 674 next forwards the ARP request to the NCE 678 via a control plane portion of the Communications Network 610 and the Access Switch 650 (as depicted by a message 692). Upon receipt of the ARP request, the NCE 678 can broadcast the ARP request to every peripheral processing device currently coupled to the Access Switch 650. For example, as shown in FIG. 6 and depicted by a message 693, the Access Switch 650 sends the ARP request to the Peripheral Processing Device 663.

The Peripheral Processing Device 663 next sends an ARP response, including its MAC address, to the NCE 678 via the Physical Port 654 and the Access Switch 650 (as depicted by a message 694). In some embodiments, the NCE 678 can at this point broadcast the ARP response to any or all other NCEs currently executing within the VLAN 684 (not shown in FIG. 6) so as to provide devices with updated address information for the Peripheral Processing Device 663. The NCE 678 can, for example, transmit the updated address information using one or more messages formatted according to the Border Gateway Protocol (BGP).

As shown in FIG. 6, the NCE 678 transmits the ARP response, including the MAC address, to the NCE 674 via the Communications Network 610 (as depicted by a message 695), which forwards the ARP response to the NCE 672 via the control plane of the Communications Network 610 and the Access Switch 630 (as depicted by a message 696). The NCE 674 can also optionally broadcast the ARP response to any or all other NCEs currently executing within the VLAN 684 and/or the VLAN 682 so as to provide devices with updated address information for the Peripheral Processing Device 663. The NCE 674 can, for example, send the updated address information using one or more messages formatted according to the Border Gateway Protocol (BGP). The NCE 674 can also optionally update its locally-stored address and/or routing information for subsequent use based on the ARP response.

Although not shown in FIG. 6, in some embodiments, the VLAN 682 and/or the VLAN 684 can be included in a Virtual Data Center Fabric ("VDCF") defined and/or included within the Switch Fabric System 600. In such embodiments, a VDCF can be a subset of network devices and/or resources included in the Switch Fabric System 600 that are associated with, for example, a particular entity or organization. For example, the Switch Fabric System 600 could include a first VDCF comprised of one or more VLANs similar to the VLAN 682 and/or the VLAN 684. Thus, each VDCF can be comprised of one or more VLANs, each VLAN being comprised of a set of some combination of one or more peripheral processing devices, physical ports NCEs and/or access switches. In such embodiments, an NCE, such as the NCE 678, can adhere to one or more routing policies by broadcasting the ARP response to all network devices included in one or more VLANs within in the same VDCF as the NCE 678, but not to devices and/or VLANs included in other VDCFs defined within the Switch Fabric System 600. The one or more routing policies can be defined by, for example, the NMM 622 and/or the NCE 674.

As further shown in FIG. 6, the NCE 672 next forwards the ARP response, including the MAC address of the Peripheral Processing Device 663, to the Peripheral Processing Device 661 (as depicted by a message 697). The NCE 672 can optionally broadcast the ARP response to any or all other NCEs currently executing within the VLAN 682 (not shown in FIG. 6) so as to provide the devices with updated address information for the Peripheral Processing Device 663. Having received the MAC address of the Peripheral Processing Device 663, the Peripheral Processing Device 661 can next address one or more data packets for transmission to the Peripheral Processing Device 663 via the Communications Network 610.

Although discussed in connection with an ARP request sent to determine a location of and/or address information for the Peripheral Processing Device 663, a RARP request (instead of an ARP request) can be used and can include a known MAC address of the Peripheral Processing Device 663. In such embodiments, rather than determining a MAC address for the Peripheral Processing Device 663 based on an IP address thereof, the RARP response can include an IP address of the Peripheral Processing Device 663 based on a known MAC address thereof, included in the RARP request. In such embodiments, the RARP request and response can follow substantially the same path through the Switch Fabric System 600 as described in reference to an ARP request and response as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments an access switch and a peripheral processing device in a data center fabric can be included in a single hardware device or module.

What is claimed is:

1. An apparatus, comprising:
a first network control entity associated with at least a portion of a plurality of data ports at a first access switch to be operatively coupled to a first peripheral processing device and a switch fabric,
the first network control entity to receive an Address Resolution Protocol (ARP) request from the first peripheral processing device, the first network control entity to transmit the ARP request to a second network control entity such that the ARP request causes the second network control entity to: (i) determine a network location of a second access switch operatively coupled to the switch fabric and (ii) define a response to the ARP request based at least on information received from a third network control entity associated with at least a portion of a plurality of data ports at the second access switch operatively coupled to the switch fabric at the network location, the information including a Media Access Control (MAC) address of a second peripheral processing device operatively coupled to the third network control entity,
the first network control entity to receive the response to the ARP request from the second network control entity and to transmit the response to the ARP request to the first peripheral processing device.

2. The apparatus of claim 1, wherein the first network control entity is associated with a first network segment and the second network control entity is associated with a second network segment.

3. The apparatus of claim 1, wherein the first network control entity and the second network control entity are associated with a single network segment.

4. The apparatus of claim 1, wherein the first network control entity is to transmit the ARP request such that the ARP request further causes the second network control entity to obtain the response to ARP request from a network management module operatively coupled to a control plane of the switch fabric.

5. The apparatus of claim 1, wherein the ARP request includes a request for the MAC address of the second peripheral processing device and the response is formatted according to the Border Gateway Protocol (BGP).

6. The apparatus of claim 1, wherein the first network control entity is operatively coupled to the second network control entity, the second network control entity configured to forward the ARP request to the third network control entity.

7. The apparatus of claim 1, wherein the ARP request includes at least one of an Internet Protocol (IP) address of the first peripheral processing device or an Internet Protocol (IP) address of the second peripheral processing device.

8. The apparatus of claim 1, wherein the first network control entity is operatively coupled to the second network control entity, the second network control entity is operatively coupled to the third network control entity, and the third network control entity is configured to broadcast the ARP request to the plurality of data ports at the second access switch.

9. An apparatus, comprising:
a processor;
a memory; and
a network management module implemented in at least one of the processor or memory, the network management module to be operatively coupled to a plurality of access switches, the network management module to define a plurality of network control entities at the plurality of access switches,
the network management module to send a first signal to associate a first network control entity from the plurality of network control entities with at least a portion of a plurality of data ports at a first access switch from the plurality of access switches, a data port from the plurality of data ports at the first access switch to be operatively coupled to a virtual machine at a first time,
the network management module to send a second signal to associate a second network control entity from the plurality of network control entities with at least a portion of a plurality of data ports at a second access switch from the plurality of access switches, the second access switch to be operatively coupled to the data plane of the switch fabric, a data port from the plurality of data ports at the second access switch to be operatively coupled to the virtual machine at a second time after the first time, the data port from the plurality of data ports at the first access switch to not be operatively coupled to the virtual machine at the second time, the second network control entity is associated with a network segment,
the network management module to send a signal such that the second network control entity is to:
receive, after the second time, an Address Resolution Protocol (ARP) request; and
send a response to the ARP request, the response to the ARP request including at least one of:
  address information of the virtual machine received at the second network control entity from a third network control entity associated with the network segment; or
  address information of the second access switch.

10. The apparatus of claim 9, wherein the network segment is a first network segment, the first access switch is associated with a second network segment.

11. The apparatus of claim 9, wherein the plurality of network control entities includes a subset of network control entities associated with the network segment and the second network control entity is to transmit, to every network control entity from the subset, at least one of:
the address information of the virtual machine; or
the address information of the second access switch.

12. The apparatus of claim 9, wherein the address information of the second access switch includes a Media Access Control (MAC) address of the second access switch.

13. The apparatus of claim 9, wherein the address information of the second access switch includes an Internet Protocol (IP) address of the second access switch.

14. The apparatus of claim 9, wherein the virtual machine is hosted, at the first time, at a first peripheral processing device operatively coupled to the first access switch, and not to the second access switch, and
the virtual machine is hosted, at the second time, at a second peripheral processing device operatively coupled to the second access switch, and not to the first access switch.

15. An apparatus, comprising:
a first network control entity associated with a first network segment that is associated with at least a portion of a plurality of data ports at a first access switch operatively coupled to a first peripheral processing device and a data plane of a switch fabric,
the first network control entity to receive an Address Resolution Protocol (ARP) request from the first peripheral processing device, the ARP request including a request for address information of a second peripheral processing device,
the first network control entity to transmit the ARP request to a second network control entity via a control plane of the switch fabric, the second network control entity to be associated with a second network segment that is associated with at least a portion of a plurality of data ports at a second access switch operatively coupled to the second peripheral processing device and the data plane of the switch fabric,
the first network control entity to transmit the ARP request that causes the second network control entity to: (i) determine a network location of a second access switch operatively coupled to the switch fabric and (ii) define a response to the ARP request based at least on information received from a third network control entity associated with at least a portion of a plurality of data ports at the second access switch operatively coupled to the switch fabric at the network location, the information including a Media Access Control (MAC) address of a second peripheral processing device operatively coupled to the third network control entity,
the first network control entity to transmit the response to the ARP request to the first peripheral processing device.

16. The apparatus of claim 15, wherein the first network control entity is to verify that a sender Internet Protocol (IP) address included in the ARP request matches an IP address of the first peripheral processing device.

17. The apparatus of claim 15, wherein the second network control entity is to transmit the address information of the second peripheral processing device to every network control entity from a plurality of network control entities associated with the first network segment, the address information being transmitted in one or more signals formatted according to the Border Gateway Protocol (BGP).

18. The apparatus of claim 15, wherein the first network control entity to transmit the ARP request further causes the second network control entity to transmit the ARP request to a plurality of network control entities associated with the second network segment.

19. The apparatus of claim 15, wherein the second network control entity to transmit the response to the ARP request to the first peripheral processing device causes the first peripheral processing device to define a data packet based at least in part on the response to the ARP request, the data packet including the address information of the second peripheral processing device.

20. The apparatus of claim 15, wherein the first network control entity is operatively coupled to the second network control entity, the second network control entity configured to forward the ARP request to the third network control entity.

* * * * *